(No Model.)
P. & J. W. HUTCHERSON.
FRUIT GATHERER.
No. 324,326.  Patented Aug. 11, 1885.
Fig. 1.
Fig. 2.
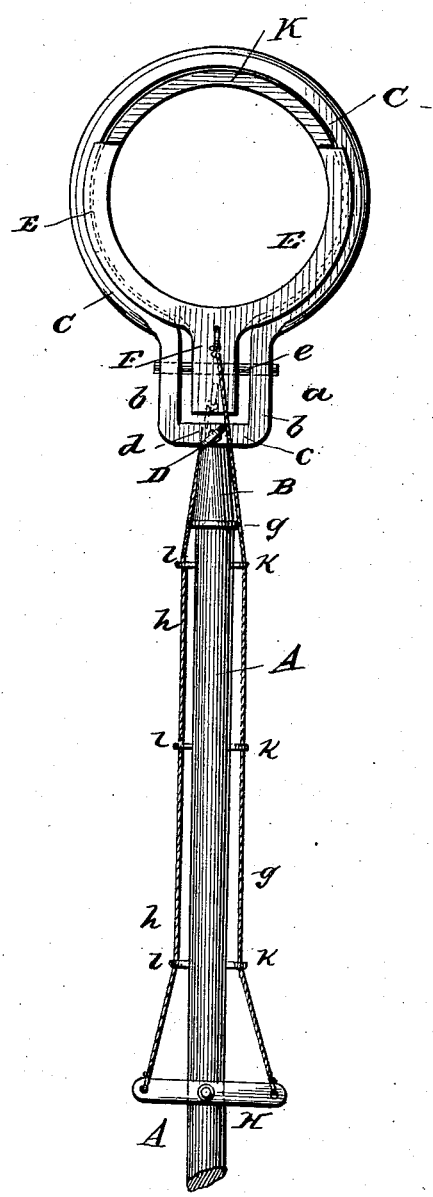
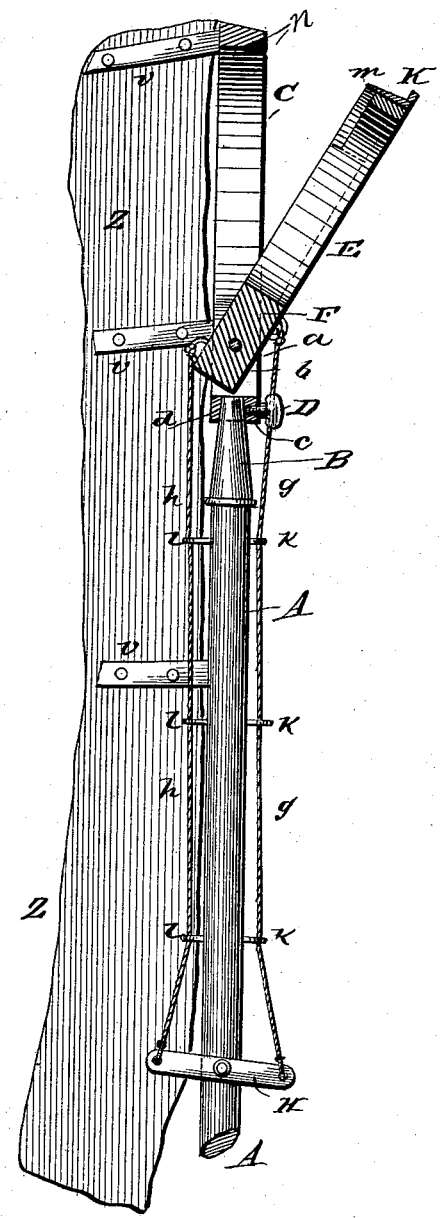
WITNESSES
INVENTORS
Peter Hutcherson
J. W. Hutcherson
by Anderson & Smith
their ATTORNEYS

UNITED STATES PATENT OFFICE.

PETER HUTCHERSON AND JOHN W. HUTCHERSON, OF SANDY RIDGE, N. C.

FRUIT-GATHERER.

SPECIFICATION forming part of Letters Patent No. 324,326, dated August 11, 1885.

Application filed June 3, 1884. Renewed June 27, 1885. (No model.)

*To all whom it may concern:*

Be it known that we, PETER HUTCHERSON and JOHN W. HUTCHERSON, citizens of the United States, residing at Sandy Ridge, in the county of Stokes and State of North Carolina, have invented certain new and useful Improvements in Cherry-Gatherers; and we do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a front view of our device, and Fig. 2 is a vertical sectional view of the same.

This invention has relation to devices for gathering fruit; and it consists in the construction and novel arrangement of parts as hereinafter set forth and pointed out in the appended claims.

In the accompanying drawings, the letter A represents the pole or staff, and B the socket, which is fastened to the upper end of the pole, and is attached to the bow C by a thumb-screw, D. The bow or ring C is of sufficient size to allow the fruit to pass easily through it, and is formed with an offset portion, $a$, consisting of two parallel bars, $b$, and a transverse bar, $c$. In the transverse bar $c$ is formed a recess or bearing, $d$, to receive the upper end of the socket B. In the bars $b$ are formed bearings for the tranverse pivot $e$, which connects the top or movable bow E to the bow C. The bow E is provided with a shank, F, which projects into the offset portion $a$ of the fixed bow C. To this shank, above the pivot $e$, is connected one of the operating-cords, $g$, the other, $h$, being connected to said shank below the pivot. These operating-cords, conducted by guide-bearings $k$ and $l$, respectively, pass downward along the pole, and are attached to opposite ends of a pivoted handle-bar, H, which is within easy reach of the operator.

K represents a curved knife, which is attached to the curved upper edge of the movable bow E. Its outer face is beveled, as indicated at $m$, and it is adapted to close inside of the bow C against the bevel bearing $n$, formed on the inside thereof at its edge. The bows and socket are designed to be made of metal.

Z represents a cloth conductor, the upper end of which is connected to the bow C. This conductor is connected to the pole A by loops $v$, and extends downward to a basket or other receptacle carried by the operator.

When the lever-handle is moved to pull the upper cord, $g$, the bow E is moved open, and the instrument can be applied to receive the fruit between the bows. Upon turning the lever-handle in the opposite direction the lower cord, $h$, is pulled, closing the knife upon the bow C and cutting the stems of the fruit, which falls through the conductor Z into the basket.

Having described this invention, what we claim, and desire to secure by Letters Patent, is—

1. A fruit-gatherer having its fixed bow formed with an offset, $a$, to which the socket B is secured by a thumb-screw, and to which the shank F of the movable bow is pivoted, the upper and lower cords, $g$ and $h$, and the handle-lever H, by which these cords are operated to open and close the movable bow, substantially as specified.

2. In a fruit-gatherer, the combination, with the pole A, its socket B, the handle-bar H, and the operating-cords $g\ h$, of the fixed bow C, having an offset, $a$, and bevel edge $n$, the movable bow E, having the curved knife K and shank F, and the cloth-conductor Z, connected to the pole by loops, substantially as specified.

In testimony whereof we affix our signatures in presence of two witnesses.

PETER HUTCHERSON.
J. W. HUTCHERSON.

Witnesses:
A. L. MOORE,
J. JONES.